(12) United States Patent
Bethard

(10) Patent No.: US 8,051,338 B2
(45) Date of Patent: Nov. 1, 2011

(54) INTER-ASIC DATA TRANSPORT USING LINK CONTROL BLOCK MANAGER

(75) Inventor: Roger A. Bethard, Chippewa Falls, WI (US)

(73) Assignee: Cray Inc., Seattle, WA (US)

( * ) Notice: Subject to any disclaimer, the term of this patent is extended or adjusted under 35 U.S.C. 154(b) by 1138 days.

(21) Appl. No.: 11/780,258

(22) Filed: Jul. 19, 2007

(65) Prior Publication Data
US 2009/0024883 A1    Jan. 22, 2009

(51) Int. Cl.
G06F 11/00    (2006.01)

(52) U.S. Cl. .......................... 714/704; 714/758; 714/807

(58) Field of Classification Search .................. 714/704, 714/758, 807
See application file for complete search history.

(56) References Cited

U.S. PATENT DOCUMENTS

| | | |
|---|---|---|
| 4,513,367 A | 4/1985 | Chan et al. |
| 4,679,166 A | 7/1987 | Berger et al. |
| 5,193,166 A | 3/1993 | Menasce |
| 5,255,384 A | 10/1993 | Sachs et al. |
| 5,280,616 A | 1/1994 | Butler et al. |
| 5,301,287 A | 4/1994 | Herrell et al. |
| 5,311,376 A * | 5/1994 | Joan et al. .................. 360/51 |
| 5,581,705 A | 12/1996 | Passint et al. |
| 5,584,039 A | 12/1996 | Johnson et al. |
| 5,784,706 A | 7/1998 | Oberlin et al. |
| 5,802,398 A | 9/1998 | Liu et al. |
| 5,805,609 A | 9/1998 | Mote, Jr. |
| 5,812,562 A | 9/1998 | Baeg |
| 5,860,025 A | 1/1999 | Roberts et al. |
| 5,860,110 A | 1/1999 | Fukui et al. |
| 5,900,023 A | 5/1999 | Pase |
| 5,928,353 A | 7/1999 | Yamada |
| 6,003,142 A | 12/1999 | Mori |
| 6,157,398 A | 12/2000 | Jeddeloh |
| 6,182,195 B1 | 1/2001 | Laudon et al. |
| 6,189,140 B1 | 2/2001 | Madduri |
| 6,202,108 B1 * | 3/2001 | Autechaud et al. ............. 710/61 |
| 6,219,288 B1 | 4/2001 | Braceras et al. |
| 6,226,695 B1 | 5/2001 | Kaiser et al. |
| 6,229,727 B1 | 5/2001 | Doyle |

(Continued)

FOREIGN PATENT DOCUMENTS
EP    0766177 A1    4/1997

OTHER PUBLICATIONS

"U.S. Appl. No. 11/611,092, Final Office Action mailed Jul. 23, 2010", 33 pgs.

(Continued)

Primary Examiner — Esaw Abraham
(74) Attorney, Agent, or Firm — Schwegman, Lundberg & Woessner, P.A.

(57) ABSTRACT

An apparatus includes a SerDes circuit and a link control block (LCB). The SerDes circuit is a first end of a SerDes circuit pair of a SerDes lane. A SerDes lane includes the SerDes circuit pair coupled by a communications medium. The LCB includes an error tracking circuit and a controller. The controller includes an error recovery module configured to retry a data communication when an error is detected and deactivate the SerDes lane when a rate of errors on the SerDes lane exceeds a threshold error rate value. Other devices, systems, and methods are disclosed.

30 Claims, 4 Drawing Sheets

U.S. PATENT DOCUMENTS

| | | | |
|---|---|---|---|
| 6,240,500 B1 | 5/2001 | Scales | |
| 6,256,683 B1 | 7/2001 | Barry | |
| 6,260,131 B1 | 7/2001 | Kikuta | |
| 6,266,801 B1 | 7/2001 | Jin | |
| 6,370,632 B1 | 4/2002 | Kikuta et al. | |
| 6,470,441 B1 | 10/2002 | Pechanek et al. | |
| 6,490,671 B1 | 12/2002 | Frank et al. | |
| 6,496,902 B1 | 12/2002 | Faanes et al. | |
| 6,629,207 B1 | 9/2003 | Yoshioka et al. | |
| 6,675,243 B1* | 1/2004 | Bastiani et al. | 710/105 |
| 6,686,920 B1 | 2/2004 | Peck, Jr. et al. | |
| 6,745,353 B2* | 6/2004 | Susnow et al. | 714/706 |
| 6,763,327 B1 | 7/2004 | Songer et al. | |
| 6,779,085 B2 | 8/2004 | Chauvel | |
| 6,813,697 B1 | 11/2004 | Tomonaga et al. | |
| 6,854,031 B1* | 2/2005 | Ouellet et al. | 710/305 |
| 6,859,861 B1 | 2/2005 | Rhodes | |
| 6,937,949 B1* | 8/2005 | Fishman et al. | 702/69 |
| 7,162,608 B2 | 1/2007 | Bethard | |
| 7,177,530 B1 | 2/2007 | Suzuka | |
| 7,234,027 B2 | 6/2007 | Kohn et al. | |
| 7,529,275 B2* | 5/2009 | Sridharan et al. | 370/514 |
| 7,890,673 B2 | 2/2011 | Bethard | |
| 2001/0049742 A1 | 12/2001 | Steely, Jr. et al. | |
| 2002/0133762 A1* | 9/2002 | Susnow et al. | 714/704 |
| 2002/0144061 A1 | 10/2002 | Faanes et al. | |
| 2002/0169938 A1 | 11/2002 | Scott et al. | |
| 2007/0088932 A1 | 4/2007 | Bethard | |

OTHER PUBLICATIONS

"U.S. Appl. No. 11/611,092, Notice of Allowance mailed Oct. 1, 2010", 7 pgs.

"U.S. Appl. No. 11/611,092, Response filed Apr. 30, 2010 to Non Final Office Action mailed Dec. 30, 2009", 18 pgs.

"U.S. Appl. No. 11/611,092, Response filed Sep. 23, 2010 to Final Office Action mailed Jul. 23, 2010", 17 pgs.

"U.S. Appl. No. 11/611,092, Advisory Action mailed Oct. 21, 2009", 3 pgs.

"European Application Serial No. 02257325.7, Office Action mailed Dec. 9, 2010", 7 pgs.

"European Application Serial No. 10011354.7, Extended European Search Report mailed Dec. 8, 2010", 9 pgs.

"U.S. Appl. No. 11/611,092, Non-Final Office Action mailed Dec. 30, 2009", 32 pgs.

"U.S. Appl. No. 11/611,092, Pre-Appeal Brief Request Oct. 26, 2009", 7 pgs.

Mano, Morris M, *Computer System Architecture, Prentice-Hall*, (1976), 460-461.

Brandt, M., et al., *The Benchmarker's Guide for CRAY SV1 Systems*, Cray Inc., (Jul. 20, 2000), p. 1-39.

Teller, P. J., et al., "Locating Multiprocessor TLBs at Memory", *Proceedings of the Twenty-Seventh Hawaii Internation Conference on Wailea*, vol. I, IEEE Computer Society, (Jan. 4, 1994), 554-563.

"U.S. Appl. No. 11/611,092, Non-Final Office Action mailed Jan. 26, 2009", 18 pgs.

"U.S. Appl. No. 11/611,092, Final Office Action mailed May 26, 2009", 29 pgs.

"U.S. Appl. No. 11/611,092, Response filed Mar. 18, 2009 to Non-Final Office Action mailed Jan. 26, 2009", 15 pgs.

"U.S. Appl. No. 11/611,092, Response filed Sep. 21, 2009 to Final Office Action mailed May 26, 2009", 16 pgs.

"U.S. Appl. No. 11/611,092, Response filed Sep. 18, 2009 to Final Office Action mailed May 26, 2009", 16 pgs.

* cited by examiner

INTER-ASIC DATA TRANSPORT USING LINK CONTROL BLOCK MANAGER

FEDERALLY SPONSORED RESEARCH OR DEVELOPMENT

The U.S. Government has a paid-up license in this invention and the right in limited circumstances to require the patent owner to license others on reasonable terms as provided for by the terms of Contact No. MDA904-02-3-0052, awarded by the Maryland Procurement Office.

TECHNICAL FIELD

The field generally relates to communication between electronic systems, and more particularly to using a SerDes circuit to communicate data point-to-point in an electronic system.

BACKGROUND

Serializer/Deserializer (SerDes) circuits communicate data over point-to-point connections. This is in contrast to bus connections in which multiple points are attached to a bus and the multiple points share time communicating over the bus. SerDes circuits transmit parallel data over a serial link between two points by converting parallel data into serial data for transmission and converting the received serial data to parallel data. This allows fewer physical interconnections to be necessary between the two points.

However, in large electronic systems, such as a large computer system for example, the number of point-to-point connections may become large and complicate an interconnection scheme. Additionally, a large number of point-to-point connections may negatively impact system reliability.

SUMMARY

This document discusses, among other things, apparatuses, systems, and methods for communicating data in an electronic system. An apparatus embodiment includes a SerDes circuit and a link control block (LCB). The SerDes circuit is a first end of a SerDes circuit pair of a SerDes lane. A SerDes lane includes the SerDes circuit pair coupled by a communications medium. The LCB includes an error tracking circuit and a controller. The controller includes an error recovery module configured to retry a data communication when an error is detected and deactivate the SerDes lane when a rate of errors on the SerDes lane exceeds a threshold error rate value.

A system embodiment includes a communications medium, a first integrated circuit (IC) and a second IC. Each IC includes a plurality of SerDes circuits. The first IC includes a first end of a SerDes circuit pair and the second IC includes a second end of a SerDes circuit pair. The SerDes circuit pair is coupled by the communications medium to form a SerDes lane. A plurality of SerDes lanes forms a SerDes channel between the first IC and the second IC. Each IC also includes an LCB communicatively coupled to the SerDes circuits on the corresponding IC. An LCB includes an error tracking circuit and a controller communicatively coupled to the error tracking circuit. The controller includes an error recovery module configured to retry a data communication when an error is detected and deactivate a SerDes lane when a rate of errors on the SerDes lane exceeds a threshold error rate value.

A method embodiment includes communicating data between a first IC and a second IC using a plurality of SerDes lanes. Each SerDes lane includes at least one SerDes circuit pair. The plurality of SerDes lanes defines a SerDes channel. The method further includes tracking an error rate during the communicating of data, retrying a data communication when an error is detected, and automatically removing a SerDes lane from the SerDes channel when a rate of errors on the SerDes lane exceeds a threshold error rate value.

This summary is intended to provide an overview of the subject matter of the present patent application. It is not intended to provide an exclusive or exhaustive explanation of the invention. The detailed description is included to provide further information about the subject matter of the present patent application.

DETAILED DESCRIPTION

In the following detailed description, reference is made to the accompanying drawings which form a part hereof, and specific embodiments in which the invention may be practiced are shown by way of illustration. It is to be understood that other embodiments may be used and structural or logical changes may be made without departing from the scope of the present invention.

Figure 1:
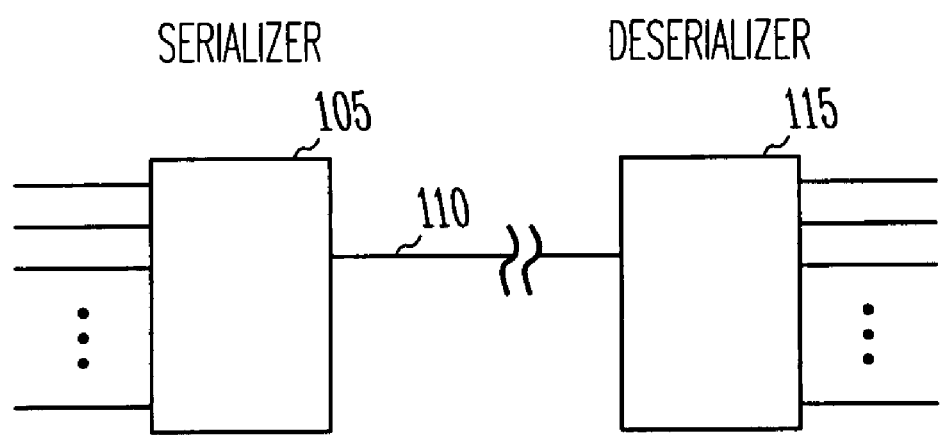
FIG. 1 is a block diagram of portions of a SerDes circuit to transmit parallel data over a point-to-point serial link.

Serializer/Deserializer (SerDes) circuits facilitate transmitting parallel data over a point-to-point serial link. This is shown in the block diagram of FIG. 1. A serializer 105 converts parallel data into serial data for transmission over a communications medium 110 and a deserializer 115 converts the received serial data back to parallel data. This allows fewer physical interconnections to be necessary between the two points. This is in contrast to a bus connection where many communication points are connected via a single bus and the communication points communicate using a bus protocol that allows the many communication points to share time on the bus without data collisions. A single SerDes interconnection may be referred to as a SerDes lane. Several SerDes lanes may comprise a SerDes channel. A SerDes channel may be a full duplex communication channel, with some SerDes lanes dedicated for transmitting data from a point and some SerDes lanes dedicated for receiving data at the point.

Application specific integrated circuits (ASICs) interconnected using high-speed SerDes serial communications have the benefit of high sustained bandwidth per ASIC pin, but the high bandwidth may come at the price of reliability. From a logic design perspective, it is useful to provide some mechanism in a SerDes channel to recover from errors and to provide tolerance for communication faults. From a system architecture perspective, one end of a SerDes channel may have no prior knowledge of what the other end of the communication channel looks like. It is useful to provide some level of auto-discovery in the interconnection system. From a physical design perspective, layout of high speed SerDes interconnection on a printed circuit board (PCB) or in a cable assembly may impose stringent requirements in order to preserve integrity of the high speed signals. In a large electronic system, the amount of interconnection is large and the mechanical assemblies used to provide the interconnection may become quite complicated. It is useful to provide some physical-to-logical SerDes lane mapping to reduce the complexity of mechanical assemblies.

Figure 2:
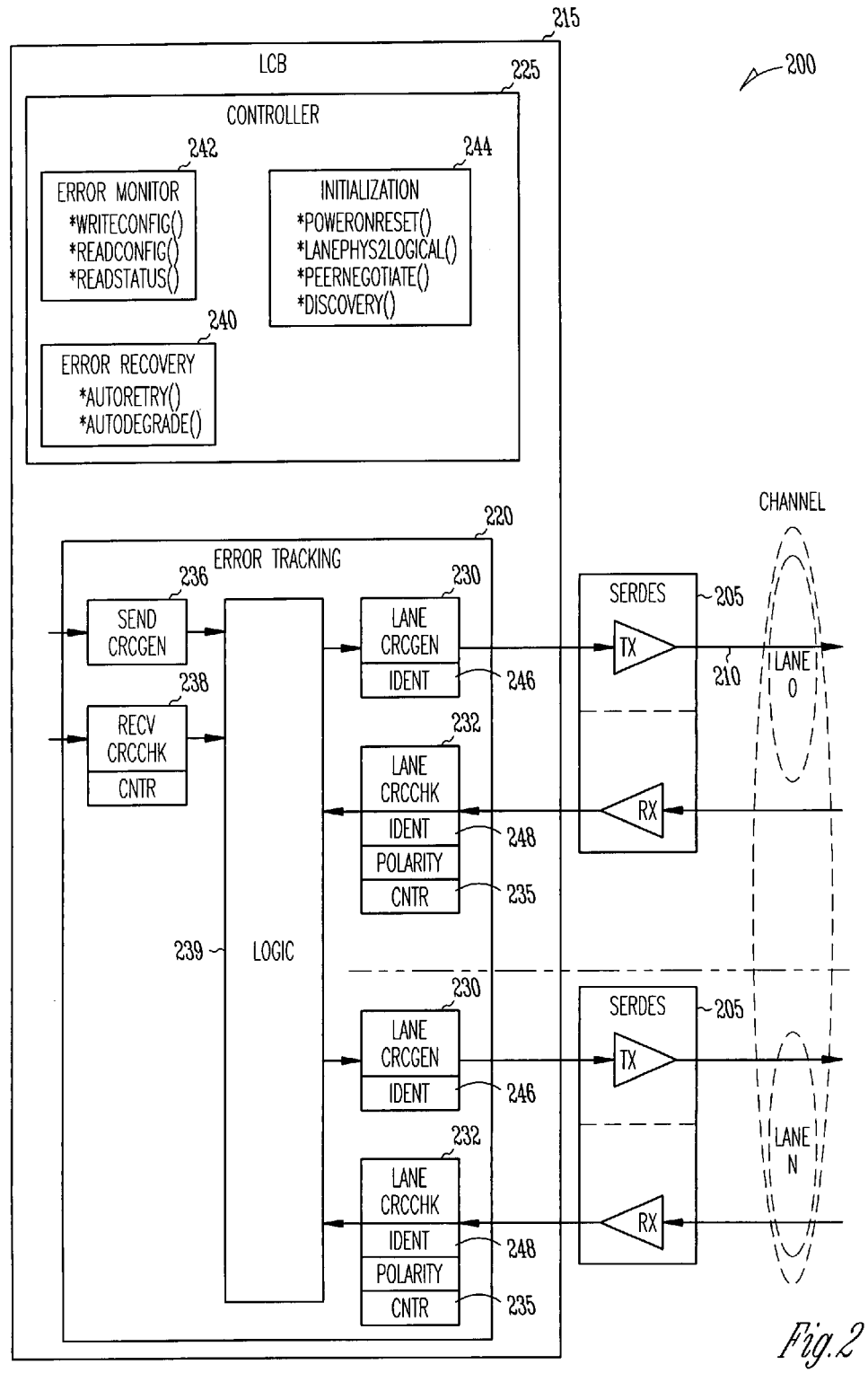
FIG. 2 is a block diagram of portions of an embodiment of a device to communicate data in an electronic system.

FIG. 2 is a block diagram of portions of an embodiment of a device 200 to communicate data in an electronic system. The device 200 includes at least one SerDes circuit 205. The SerDes circuit 205 is included in a first end of a SerDes lane. A SerDes lane includes a dedicated SerDes circuit pair coupled by a communications medium 210. In the example shown, the device 200 includes N+1 SerDes lanes numbered 0 to N, where N is an integer. The SerDes circuit 205 is part of a SerDes circuit pair and includes a serializer for transmitting data or a deserializer for receiving data. A SerDes circuit pair may communicate differential signals over the communications medium 210. In some embodiments, the communications medium 210 includes interconnection on a printed circuit board (PCB). In some embodiments, the communications medium 210 includes a cable assembly, such as between two PCBs for example. In some embodiments, the device 200 is included in an application specific integrated circuit (ASIC). In some embodiments, the device 200 is included in a field programmable gate array (FPGA).

The device 200 also includes a link control block (LCB) 215 to control communication of data over a SerDes serial link. The LCB 215 is communicatively coupled to the SerDes circuit 205 and includes an error tracking circuit 220 and a controller 225. The error tracking circuit 220 keeps track of errors that may occur during a data communication.

In some embodiments, the error tracking circuit 220 includes a cyclic redundancy code (CRC) generator circuit 230 and a CRC checker circuit 232 for each SerDes lane. The CRC generator circuit 230 calculates a CRC for a segment of data communicated via the SerDes pair for the SerDes lane. The CRC is transmitted over the communications medium 210 with the segment of data via the transmitter (TX). A CRC is received over the communications medium with a data segment at the receiver (RX). The error tracking circuit 220 detects an error in the received data segment using the lane CRC checker circuit 232. In some embodiments, the error tracking circuit 220 includes a counter 235 to track the number of errors that occur in the SerDes lane. In some embodiments, the LCB 215 includes a top-level CRC generator circuit 236 and CRC checker circuit 238 for the datapath. The logic 239 divides the datapath into the SerDes lanes.

The controller 225 may be implemented using hardware circuits, firmware, software or any combination of hardware, firmware and software. Examples, include a microcontroller, a logical state machine, and a processor such as a microprocessor, application specific integrated circuit (ASIC), or other type of processor. The controller 225 is configured to perform or execute a function or functions. Such functions correspond to modules, which are software, hardware, firmware or any combination thereof. Multiple functions may be performed in one or more modules.

The controller 225 includes an error recovery module 240. The error recovery module 240 automatically retries a data communication when an error is detected during the transmission. If the error tracking circuit 220 determines that a rate of errors (e.g., a bit error rate, or BER) on the SerDes lane exceeds a threshold error rate value, the error recovery module 240 automatically deactivates (degrades) the SerDes lane.

In some embodiments, the controller 225 includes an error monitor module 242. The error monitor module 242 allows LCB configuration registers to be read and written by higher-level logic in the rest of the electronic system. The error monitor module 242 also provides access to status configuration information, such as in a status register for example. In certain embodiments, the error monitor module 242 includes error rate information specific to SerDes lanes. In some embodiments, the controller 225 includes an initialization module 244. The initialization module 244 performs any housekeeping tasks after power-up.

Figure 3:
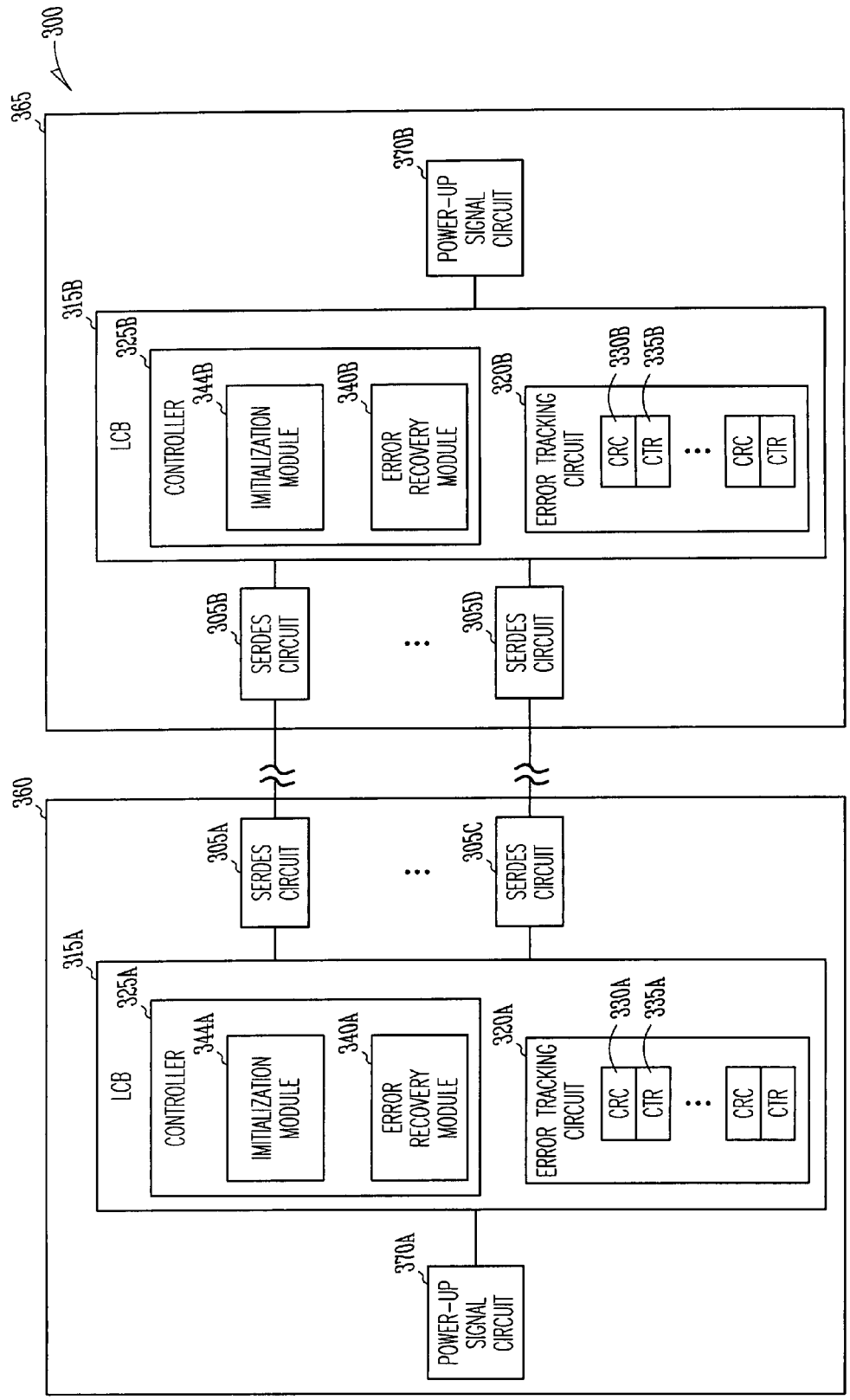
FIG. 3 is a block diagram of portions of an embodiment of a system to communicate data.

FIG. 3 is a block diagram of portions of an embodiment of a system 300 to communicate data. The system 300 includes a first integrated circuit (IC) 360, a second IC 365, and a communications medium 310. Each IC includes a plurality of SerDes circuits 305A-305D. A SerDes circuit 305A-305D is included in a first end of a SerDes lane. A SerDes lane includes a dedicated SerDes circuit TX/RX pair coupled by a communications medium 310. The first IC 360 includes a first end of a SerDes lane and the second IC includes a second end of the SerDes lane (e.g., SerDes circuits 305A and 305B). The transmitting (TX) SerDes circuit and the receiving (RX) SerDes circuit form a full duplex connection in the SerDes channel. The plurality of SerDes circuits 305A-305D form a SerDes channel between the first IC 360 and the second IC 365.

In some examples, the first IC 360 and the second IC 365 reside on a single PCB. In some examples, the first IC 360 and the second IC 365 reside on different PCBs. The system 300 may include more than one SerDes channel between the first IC 360 and the second IC 365. The system may include an additional SerDes channel between the first IC 360 and a third IC.

Each IC includes an LCB. Each LCB includes an error tracking circuit 320A, 320B and a controller 325A, 325B. The LCB 315A, 315B receives data from higher-level logic internal to the IC 360, 365 and may buffer the data for transmission, such as by using a FIFO for example. The error tracking circuit 320A, 320B includes logic that takes data from the buffer verifies data integrity, and merges the data with any protocol information. The merged data is then parceled out to all enabled transmitting SerDes lanes, such as by a round-robin fashion for example.

On a receiving end of a SerDes lane, the LCB 315A, 315B receives the transmitted data, removes the protocol information, verifies the data integrity, and pushes the verified data into the internal higher-level logic of the receiving IC 360, 365. This process happens simultaneously on both ends of the SerDes channel to implement a full duplex channel.

The controller 325A, 325B includes an error recovery module 340A, 340B configured to retry a data communication over a SerDes lane when an error is detected during the data communication. The error recovery module 340A, 340B is also configured to deactivate or disable the SerDes lane when a rate of errors on the SerDes lane exceeds a threshold error rate value. Data communication then continues using the remaining SerDes lanes.

Figure 4:
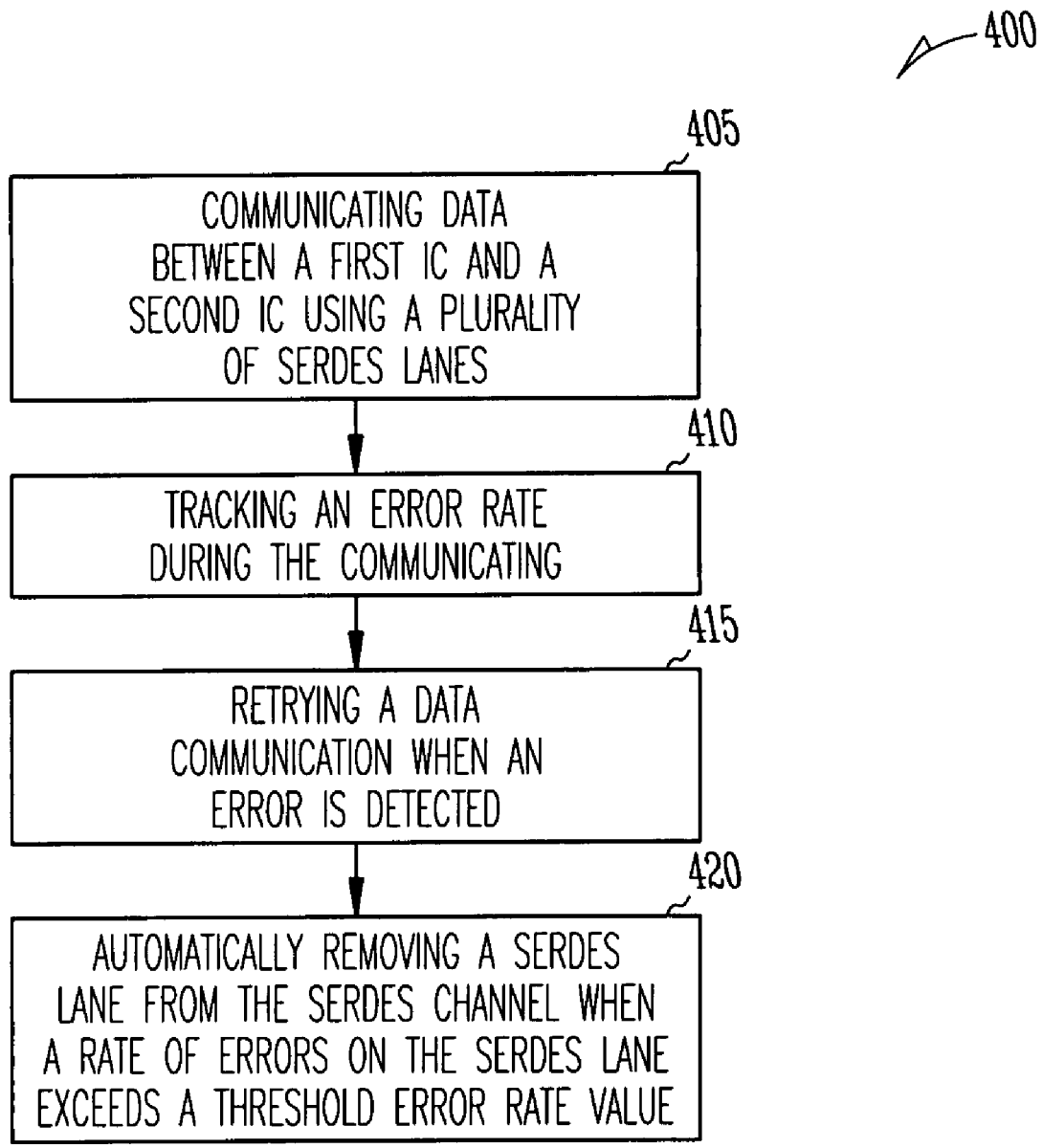
FIG. 4 is a flow diagram of an embodiment of a method to communicate data in an electronic system.

FIG. 4 is a flow diagram of an embodiment of a method 400 to communicate data in an electronic system. At block 405, data is communicated between a first circuit IC and a second IC using a plurality of SerDes lanes. Each SerDes lane includes at least one SerDes circuit pair and the plurality of SerDes lanes defines a SerDes channel. At block 410, an error rate is tracked during the communicating of data. At block 415, a data communication is retried when an error is detected. At block 420, at least one SerDes lane is automatically removed or deactivated from the SerDes channel when a rate of errors on the SerDes lane exceeds a threshold error rate value. In some embodiments, only the data receive or the data transmit portion of the SerDes lane may be removed from the channel when errors on a SerDes lane exceed a threshold error rate value; degrading the SerDes lane to half duplex. In some embodiments, both the data transmitting lane and a data receiving lane may be deactivated in pairs even though the errors are occurring in only one direction. In some embodiments, the control over the SerDes channel may be based on multiples of the SerDes lanes. An LCB may deactivate a group of SerDes lanes (e.g., two to four) event though only one SerDes lane of the group has exceeded the threshold error rate for deactivating or removing.

Returning to FIG. 3, in some embodiments, each LCB 315A, 315B includes a power-up signal circuit 370A, 370B and an initialization module 344A, 344B. The power-up signal circuit 370A, 370B transmits a signal upon power up of the LCB 315A, 315B. The power-up signal circuit 370A, 370B transmits the signal to at least one initialization module 344A, 344B; either the initialization module that is local, remote, or both the local and the remote initialization module. The initialization module 344A, 344B is included in the controller 315A, 315B and determines an order of power-up of the LCB 315A of the first IC 360 and the LCB 315B of the second IC 365. Using the signal transmitted from the power-up signal circuit 370A, 370B, the initialization module 344A, 344B includes a peerNegotiate( ) function that determines which LCB is the primary LCB and which LCB is the secondary LCB.

In some embodiments, the first LCB to power-up relative to the other LCB is declared the primary LCB. The primary LCB is responsible for managing the error counters for the SerDes channel and determining whether to downgrade the SerDes channel. Either of the peer LCBs 315A, 315B can be declared the primary LCB depending on the sequence of power-up. The error recovery module 340A, 340B of the primary LCB deactivates SerDes lanes according to a rate of errors.

According to some embodiments, the LCB 315A, 315B determines the physical-to-logical SerDes lane mapping after power-up of the system 300. A large computer system may include hundreds to thousands of communication channels. During assembly or manufacturing of such a system, the correct bit alignment of data communication interconnect often has to be tracked. A better method is to allow the communication channel to self-discover the logical mapping, or channel configuration, that has been provided by the physical interconnect. Automatically determining the channel configuration simplifies the manufacture of PCB and cable assemblies. Determining the channel configuration includes determining the number of lanes in the channel and the connection polarity of the SerDes lanes in the SerDes channel (e.g., the bit polarity of a connection).

To determine the lane mapping, in certain examples the controller 325A, 325B is configured to transmit a signal over each SerDes lane of the SerDes channel. The controller 325A, 325B of each LCB 315A, 315B transmits the signal to determine the channel configuration. In certain examples, transmitting the signal includes a first PCB transmitting a SerDes lane identifier (e.g., identifier 246 in FIG. 2) to its peer LCB over each SerDes lane of the SerDes channel and receiving a lane identifier 248 from its peer LCB to determine the physical-to-logical SerDes lane mapping of the SerDes channel.

According to some embodiments, the lane-mapping is determined using a channel discovery feature during an initialization period that follows power-up. In channel discovery, an initialization module of the controller 325A, 325B receives a coded value uniquely identifying a specific LCB in the electronic system and writes the coded value into an LCB configuration register included in an error monitor module in the controller 325A, 325B, such as in error monitor module 242 of FIG. 2. The error monitor module provides read-only access to its coded value. During an operation to read the coded value, the coded value is transmitted from the specific LCB to its peer LCB in the SerDes channel (e.g., from LCB 315A to LCB 315B) across the communications medium 310 using one of the SerDes lanes. At the same time, the peer LCB provides read-only access of its unique code value to the first LCB (e.g., from LCB 315B to LCB 315A). In this way, both ends of the SerDes channel "discover" the unique identity of the LCB peer, among the hundreds or thousands of LCBs, to which it is attached by the exchange of unique coded values.

A maintenance system (e.g., a server) or systems responsible for controlling and observing the individual LCBs may customize the individual LCB configurations based on the channel discovery coded values by writing configuration registers in the error monitor module. The maintenance system contains information regarding the deployment of the SerDes channels and may also report an error in system cabling based on the expected LCB configuration results.

To detect an error during a data communication, the error tracking circuit 320A, 320B includes a CRC circuit 330A, 330B for each SerDes lane. The CRC circuits 330A, 330B may include a CRC generating circuit and a CRC checking circuit. The error tracking circuit 320A, 320B calculates CRC for a data segment transmitted via the SerDes lane and the controller 325A, 325B transmits the CRC after each data segment. In certain embodiments, the error tracking circuit 320A, 320B is configured to calculate a CRC for a data segment of configurable size. The error tracking circuit 320A, 320B calculates CRC for a data segment received over a SerDes lane and detects an error specific to each SerDes lane using a received CRC.

When a failure in reliable transmission occurs, the error recovery module 340A, 340B on both sides of the SerDes may temporarily halt communication on the SerDes lane. The failure can be due to a soft (e.g., intermittent) error or a hard error (e.g., consistent) on the SerDes lane. The error recovery module 340A, 340B on both sides of the transmission communicates or exchanges error rate information that is specific to the SerDes lane to the other LCB. In some embodiments, the error recovery module 340A, 340B retries the communication of data over the SerDes lane. In certain embodiments, the error rate information includes transmit error rate information specific to the SerDes lane. In certain embodiments, the error rate information includes receive error rate information specific to the SerDes lane.

Based upon the error rate information, the LCBs of the first IC 360 and the second IC 365 may retry communication. If an additional error is detected on a subsequent data communication, the LCBs 315A, 315B again exchange error rate information specific to the SerDes lane between the first IC 360 and the second IC 365.

Based upon the error rate information, the primary LCB may deactivate the SerDes lane where the errors are occurring. For example, the primary LCB may disable a SerDes lane if the error rate information exceeds a threshold error rate value. The auto-degraded channel resumes normal operation. The controller 325A, 325B resumes communicating data so that all data is transmitted from the buffers and received into the buffers without repetition of data. It is more likely that the error recovery module 340A, 340B retries the communication in the presence of soft errors, and it is more likely that the primary LCB will deactivate a SerDes lane in the presence of hard errors.

To track errors, the error tracking circuit 320A, 320B may include a counter 335A, 335B for each SerDes lane. The counter 335A, 335B is incremented when an error occurs for the corresponding SerDes lane. In certain embodiments, the error tracking circuit 320A, 320B periodically resets the counter 335A, 335B after a period of time. If the counter 335A, 335B reaches a certain error count within that period of time, the SerDes lane is experiencing a rate of errors of at least that count within the period of time. In certain embodiments, the error tracking circuit 320A, 320B increments the counter 335A, 335B by a first value (e.g., two) if an error is detected during communication of a data segment, and decrements the counter by a second value usually less than the first value (e.g., one) if no error occurs during communication of a subsequent data segment. This "rewards" a SerDes lane for error-less communications that occur after a communication having an error. Having different first and second values weighs rewards different than penalties due to errors. The error recovery module of the primary LCB deactivates the SerDes lane when the counter 335A, 335B reaches a specified count.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations, or variations, or combinations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own.

What is claimed is:

1. An apparatus comprising:
   a serializer/deserializer (SerDes) circuit, wherein the SerDes circuit is a first end of a SerDes circuit pair of a SerDes lane, wherein a SerDes lane includes the SerDes circuit pair coupled by a communications medium; and
   a link control block (LCB) communicatively coupled to the SerDes circuit, the LCB including:
      an error tracking circuit; and
      a controller, communicatively coupled to the error tracking circuit, including an error recovery module configured to:
         retry a data communication when an error is detected; and
         deactivate the SerDes lane when a rate of errors on the SerDes lane exceeds a threshold error rate value.

2. The apparatus of claim 1, including a plurality of SerDes circuits to be included in a plurality of SerDes lanes, wherein the error tracking circuit includes a cyclic redundancy code (CRC) circuit for each SerDes lane, wherein the CRC circuit calculates a CRC for a data segment communicated via a SerDes circuit pair for that SerDes lane, and
   wherein the controller is configured to transmit a CRC with the data segment and the error tracking circuit detects an error using a received CRC.

3. The apparatus of claim 1, including a plurality of SerDes circuits to be included in a plurality of SerDes lanes, wherein the error tracking circuit includes a counter for each SerDes lane, and wherein the controller is configured to:
   increment the counter by a first value if an error is detected during communication of a data segment; and
   decrement the counter by a second value if no error occurs during communication of a subsequent data segment.

4. The apparatus of claim 1, including a plurality of SerDes circuits to be included in a plurality of SerDes lanes, and wherein the error recovery module is configured to:
   halt communication of data over a SerDes lane when an error is detected for a communication on that SerDes lane; and
   communicate error rate information specific to the SerDes lane.

5. The apparatus of claim 1, including a plurality of SerDes circuits to be included in a plurality of SerDes lanes, and wherein the error recovery module is configured to:
   halt communication of data over a SerDes lane when an error is detected for a communication on that SerDes lane;
   retry the communication of data;
   transmit error rate information specific to the SerDes lane; and
   receive error rate information specific to the SerDes lane.

6. The apparatus of claim 1, including:
   a power-up signal circuit to transmit a signal upon power-up of the LCB;
   an initialization module to determine an order of power-up of the LCB relative to a second LCB, and to declare a primary LCB according to the order of power-up; and
   a plurality of SerDes circuits to be included in a plurality of SerDes lanes, wherein the plurality of SerDes lanes define a SerDes channel, and wherein the controller is configured to transmit at least one signal over each SerDes lane of the SerDes channel to determine the channel configuration.

7. The apparatus of claim 6, wherein the controller is configured to transmit at least one SerDes lane identifier over each SerDes lane of the SerDes channel to determine a physical-to-logical SerDes lane mapping of the SerDes channel.

8. The apparatus of claim 1 including:
   a plurality of SerDes circuits to be included in a plurality of SerDes lanes communicatively coupled to the LCB, wherein the plurality of SerDes lanes define a SerDes channel, and
   wherein the LCB includes a configuration register to receive a coded value that uniquely identifies the LCB, and wherein the controller is configured to transmit the coded value to a peer LCB.

9. The apparatus of claim 1, wherein the apparatus is included in an application specific integrated circuit (ASIC).

10. The system of claim 1, wherein the apparatus is included in a field programmable gate array (FPGA).

11. A system comprising:
    a communications medium; and
    a first integrated circuit (IC) and a second IC each including:
       a plurality of serializer/deserializer (SerDes) circuits; and
       a link control block (LCB) communicatively coupled to the SerDes circuits, the LCB including:
          an error tracking circuit; and
          a controller, communicatively coupled to the error tracking circuit, wherein the controller includes an error recovery module configured to:
             retry a data communication when an error is detected; and deactivate a SerDes lane when a rate of errors on the SerDes lane exceeds a threshold error rate value, and wherein the first IC includes a first end of a SerDes circuit pair and the second IC includes a second end of a SerDes circuit pair, wherein a SerDes circuit pair coupled by the communications medium forms a SerDes lane, and wherein a plurality of SerDes lanes form a SerDes channel between the first IC and the second IC.

12. The system of claim 11, wherein the LCB includes:
a power-up signal circuit to transmit a signal upon power-up of the LCB;
an initialization module to determine an order of power-up of the LCB of the first IC and the LCB of the second IC, and to declare a primary LCB according to the order of power-up; and
wherein the error recovery module is configured to deactivate the SerDes lane according to the rate of errors when the LCB is the primary LCB.

13. The system of claim 11, wherein the controller is configured to transmit at least one signal over each SerDes lane of the SerDes channel to determine a physical-to-logical mapping of the SerDes lanes of the SerDes channel.

14. The system of claim 13, wherein the signal includes a SerDes lane identifier.

15. The system of claim 11, wherein the controller includes a configuration register to receive a coded value unique to the LCB during an initialization period after power-up, and wherein the controller of the LCB of the first IC and the controller of the LCB of the second IC are configured to exchange the unique coded values to determine a physical-to-logical mapping of the SerDes lanes of the SerDes channel.

16. The system of claim 11, wherein the error recovery module is configured to:
halt communication of data over a SerDes lane when an error is detected for a communication on that SerDes lane; and
communicate error rate information specific to the SerDes lane to another LCB.

17. The system of claim 16, wherein the error tracking circuit includes a first cyclic redundancy code (CRC) circuit for each SerDes lane to calculate at least one of a CRC for a data segment transmitted on the SerDes lane and a CRC for a data segment received on the SerDes lane; and
wherein the controller is configured to transmit the CRC with the transmitted data segment and the error tracking circuit detects an error specific to each SerDes lane using a received CRC.

18. The system of claim 17, wherein the error tracking circuit is configured to calculate a CRC for a data segment of configurable size, and wherein the controller is configured to transmit a CRC after each data segment on each SerDes lane.

19. The system of claim 11, wherein the first IC and the second IC reside on a single printed circuit board (PCB).

20. The system of claim 11, wherein the first IC and the second IC reside on different PCBs.

21. A method comprising:
communicating data between a first integrated circuit (IC) and a second IC using a plurality of SerDes lanes, wherein each SerDes lane includes at least one SerDes circuit pair, and wherein the plurality of SerDes lanes defines a SerDes channel between the first IC and the second IC;
tracking an error rate during the communicating;
retrying a data communication when an error is detected; and
automatically removing a SerDes lane from the SerDes channel when a rate of errors on the SerDes lane exceeds a threshold error rate value.

22. The method of claim 21, including:
temporarily halting the communicating over a SerDes lane when an error is detected for a communication specific to the SerDes lane;
exchanging error rate information specific to the SerDes lane between the first IC and the second IC; and
resuming the communicating.

23. The method of claim 22, wherein the exchanging error rate information includes:
for each SerDes lane, periodically calculating a cyclic redundancy code (CRC) on a segment of data communicated on the SerDes lane; and
transmitting the CRC over the SerDes lane with the data segment.

24. The method of claim 23, wherein the tracking an error rate includes:
incrementing an error count by a first value if an error occurs during communication of a data segment; and
decrementing the error count by a second value if no error occurs during communication of a subsequent data segment.

25. The method of claim 21, including:
temporarily halting the communicating over a SerDes lane when an error is detected for a communication specific to the SerDes lane;
retrying the data communication; and
exchanging error rate information specific to the SerDes lane between the first IC and the second IC if an additional error is detected on a subsequent data communication.

26. The method of claim 21, wherein the tracking an error rate includes tracking a rate of soft error failures and a rate of hard error failures.

27. The method of claim 21, including:
powering-up the SerDes channel; and
determining the configuration of the SerDes channel, including the number of lanes in the channel and a connection polarity of the SerDes lanes in the SerDes channel.

28. The method of claim 27, wherein the powering-up includes:
powering-up a link control block (LCB) on the first IC and a LCB on the second IC;
declaring a second LCB to power-up to be a primary LCB, and
wherein determining the configuration includes the first and the second LCB transmitting a SerDes lane identifier over each SerDes lane of the SerDes channel.

29. The method of claim 28, wherein the determining the configuration includes determining a physical-to-logical mapping of the SerDes lanes in the SerDes channel.

30. The method of claim 27, including:
receiving a first unique coded value into a configuration register of an LCB on the first IC;
receiving a second unique coded value into a configuration register of an LCB on the second IC; and
wherein determining the configuration of the SerDes channel includes exchanging the first and second unique coded values between the LCBs of the first and second ICs.

* * * * *

UNITED STATES PATENT AND TRADEMARK OFFICE
CERTIFICATE OF CORRECTION

| | | |
|---|---|---|
| PATENT NO. | : 8,051,338 B2 | Page 1 of 1 |
| APPLICATION NO. | : 11/780258 | |
| DATED | : November 1, 2011 | |
| INVENTOR(S) | : Roger A. Bethard | |

It is certified that error appears in the above-identified patent and that said Letters Patent is hereby corrected as shown below:

ON THE TITLE PAGE:
ITEM (56) REFERENCES CITED
On page 2, under "Other Publications", in column 2, line 18, delete "Internation" and insert -- International --, therefor.

IN THE DRAWINGS:
On Sheet 3 of 4, Reference Numeral 344A, Figure 3, line 1, delete "IMITIALIZATION" and insert -- INITIALIZATION --, therefor.

On Sheet 3 of 4, Reference Numeral 344B, Figure 3, line 1, delete "IMITIALIZATION" and insert -- INITIALIZATION --, therefor.

IN THE SPECIFICATIONS:
In column 4, line 65, delete "event" and insert -- even --, therefor.

Signed and Sealed this
Twenty-fourth Day of January, 2012

David J. Kappos
*Director of the United States Patent and Trademark Office*